No. 768,471. Patented August 23, 1904.

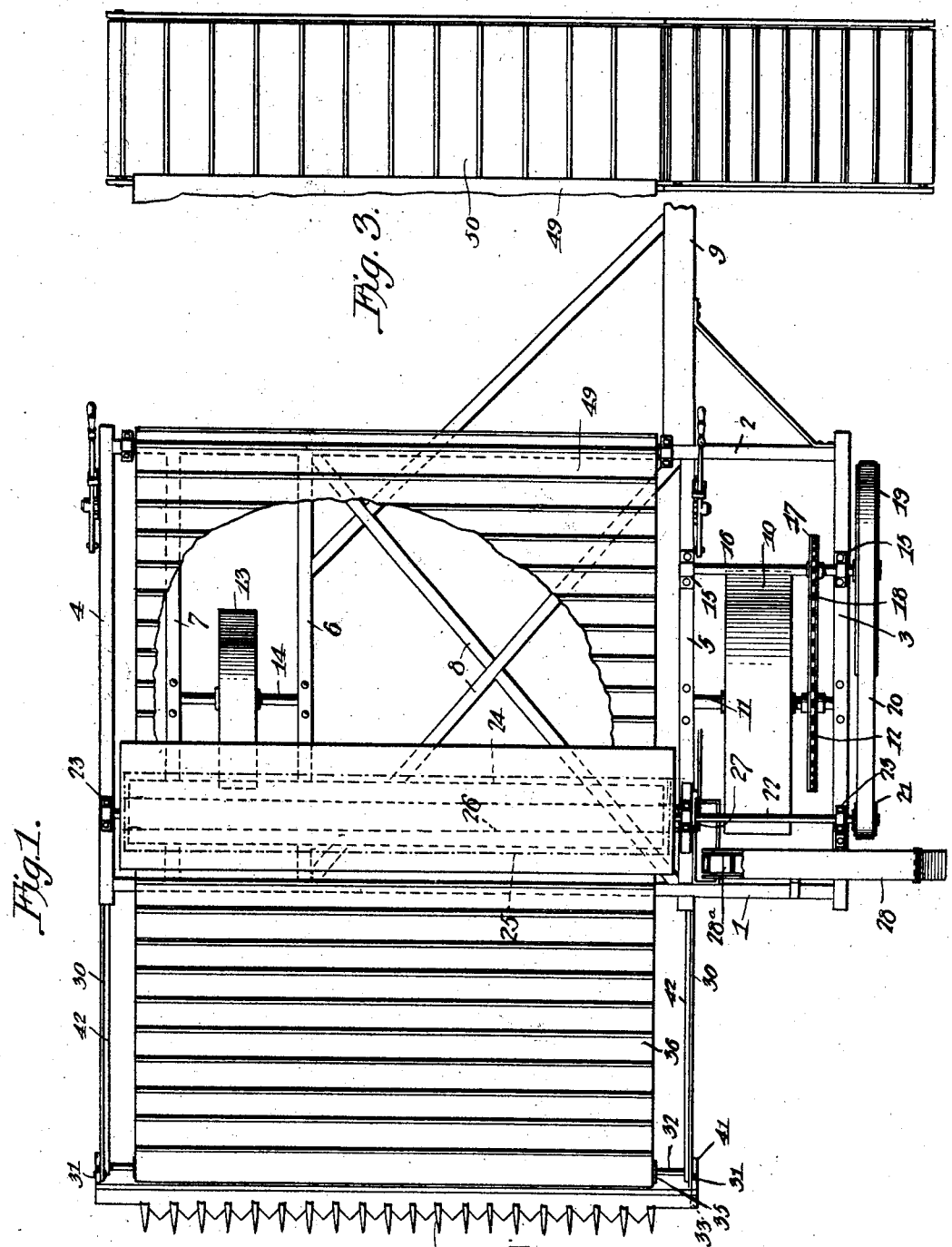

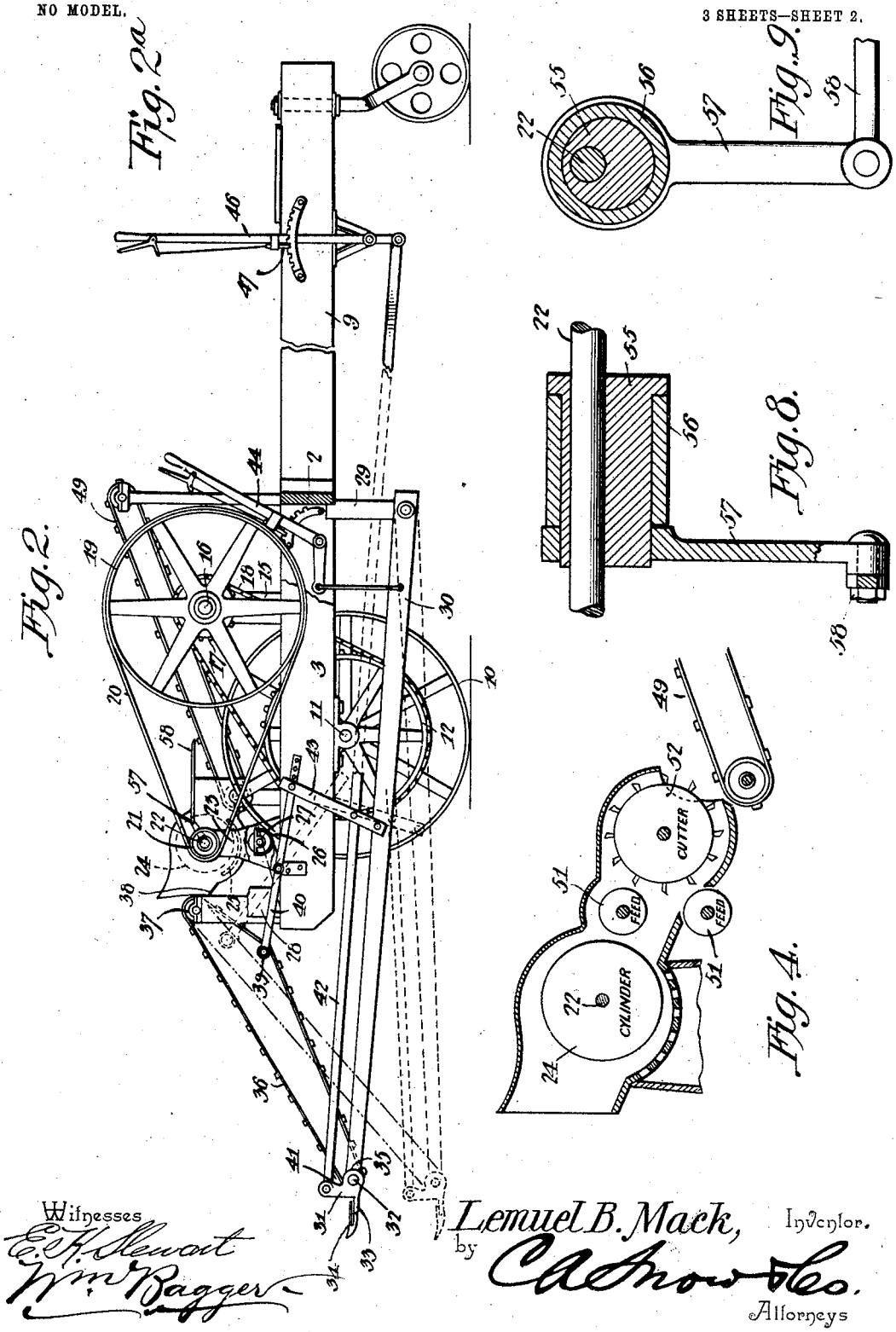

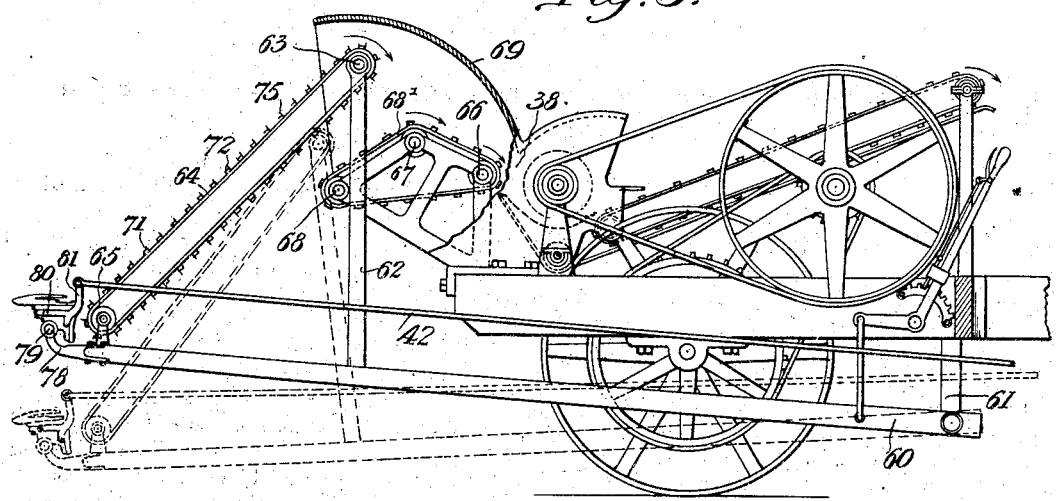
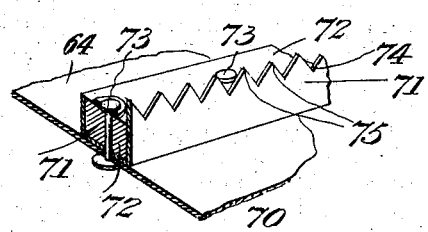
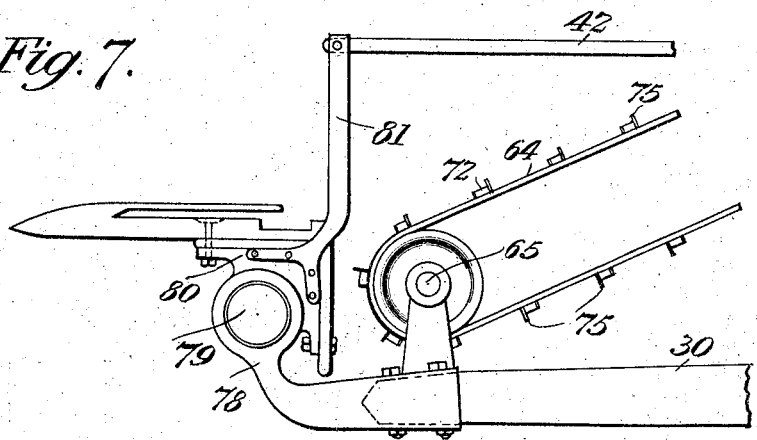

UNITED STATES PATENT OFFICE.

LEMUEL B. MACK, OF WALLA WALLA, WASHINGTON.

HARVESTER AND THRESHER.

SPECIFICATION forming part of Letters Patent No. 768,471, dated August 23, 1904.

Application filed August 18, 1903. Serial No. 169,917. (No model.)

*To all whom it may concern:*

Be it known that I, LEMUEL B. MACK, a citizen of the United States, residing at Walla Walla, in the county of Wallawalla and State of Washington, have invented a new and useful Harvester and Thresher, of which the following is a specification.

This invention relates to that class of machines in which are combined means for cutting grain and means for threshing out the heads, said cutting and threshing means being combined in a simple organized machine.

My invention relates more particularly to the combination, with a single supporting-frame, of a cutter-frame adjustably connected therewith, threshing mechanism supported on said supporting-frame, grain-elevating means for conveying the cut grain from the cutting mechanism to the thresher mechanism, said elevating mechanism being so constructed and arranged that it shall be adapted to operate successfully in any position that the cutting mechanism may occupy with relation to the threshing mechanism, so that the grain may be cut at any desired height from the ground without materially altering the machine except by properly adjusting the cutter-frame with relation to the main supporting-frame. This feature is one of special importance in sections where it shall be desired to save the straw or part of the straw for fodder, my invention being constructed with this end in view, as will be hereinafter more fully set forth.

The general object of my invention may be stated to be to provide a combined harvesting and threshing machine whereby the grain may be cut at any distance from the ground, whereby the heads may be threshed out, whereby the chaff may be saved with the grain for fodder purposes, and whereby the straw may be either deposited upon the ground, loaded upon wagons, or chopped for fodder purposes and delivered in this condition to vehicles following the harvester and thresher for the purpose of receiving the same.

My invention further consists in the improved construction, arrangement, and combination of parts, which will be hereinafter fully described, and particularly pointed out in the claims.

It will be understood that my invention is capable of being applied to a variety of harvesting-machines. In the accompanying drawings I have shown the invention as applied to a header.

In said drawings, Figure 1 is a plan view of a header constructed in accordance with my invention. Fig. 2 is a side elevation of the same. Fig. 2$^a$ is a side elevation showing the extreme rear end of the machine and illustrating a slight modification. Fig. 3 is a plan view showing a modification. Fig. 4 is a side view showing another modification. Fig. 5 is a part-sectional side elevation illustrating a modified form of the cutter-frame and the carrying mechanism for conveying the grain to the threshing mechanism. Fig. 6 is a detail view showing the preferred construction of the endless-carrier slats. Fig. 7 is a detail view showing a modified arrangement of the cutting apparatus. Figs. 8 and 9 are detail views showing means for adjusting the threshing-cylinder.

Corresponding parts in the several figures are indicated by similar numerals of reference.

The frame of the header to which my invention is applied is composed of front and rear beams 1 and 2, connected by side bars 3 and 4 and having transverse braces 5, 6, and 7 and diagonal braces 8. All of these frame members may be constructed and put together in any suitable manner, and the frame is furthermore provided with a suitably-braced rearwardly-extending push-bar, a portion of which has been shown at 9.

The side bar 3 and brace 5 support the axle of the main traction-wheel or bull-wheel 10. Said axle 11 also carries a sprocket-wheel 12. The opposite end of the frame is supported by a traction-wheel 13, mounted upon a shaft 14, which is journaled in the braces 6 and 7.

Uprights 15 upon the side bar 3 and braces 5 of the frame support a shaft 16, carrying a small sprocket-wheel 17, to which motion is transmitted by means of a chain 18 from the sprocket-wheel 12 upon the main axle. The shaft 16 carries at its outer end a large pulley or band-wheel 19, which is connected, by means of a band 20, with a pulley 21 upon a shaft 22, which extends entirely across the frame, having bearings in posts or uprights 23, rising from the side bars 3 and 4. The shaft 22 carries the cylinder 24, which extends between the uprights 23, rising from the side bars 4, and the brace 5, thus taking in the entire width of the frame, except the space between the brace 5 and the side bar 3, which is occupied by the bull-wheel and the means for transmitting motion.

Below the threshing-cylinder and coöperating therewith is a concave 25, and suitably disposed below the latter is a trough 26 for the reception of the threshed grain. A screw conveyer 27, suitably disposed in said trough, conveys the grain to an elevator $28^a$ of ordinary construction, the casing of which is shown at 28. The cylinder and concave are to be of an improved construction specially adapted to the purposes for which they are intended in this connection. This construction, however, is not a part of the present application, but will be fully set forth and claimed in a companion application of even date with the present one. It may be stated, however, that the cylinder and concave are not to be provided with teeth or spikes for the purpose of removing the kernels from the heads, but are rather constructed so as to exercise a rubbing action upon the heads of the grain, which is effective in removing the grain thoroughly from the heads and also to preserve the straw unbroken. It is obvious that the threshing or rubbing cylinder is to be provided with a suitable hood or casing and that means are to be employed for conveying the unthreshed grain to and the straw as well as the grain from the threshing mechanism.

The supporting-frame which has been thus far described may be designated the "main" frame of the machine. Said supporting-frame is provided with suitably-disposed downwardly-extending brackets near its rear end, as shown at 29. To the lower ends of said brackets are pivotally connected the side beams 30 of the cutter-frame, said side beams being provided at their front ends with L-shaped castings 31, which may be pivotally mounted upon a cross-bar or shaft 32, connecting the front ends of said side bars. The L-shaped brackets 31 are provided with forwardly-extending lugs 33, upon which the cutting apparatus 34 is supported. The shaft 32 carries a roller 35, which forms the support for the lower end of an endless carrier 36, which serves to convey the cut grain to the threshing mechanism, the upper end of said endless carrier being supported upon a suitably-mounted roller 37, which is permanently disposed in front of the threshing mechanism and from which a feed-board 38 extends to the space between the cylinder and concave. Said feed-board may form part of the casing which in practice surrounds the threshing mechanism. The endless carrier 36, in addition to the supporting-rollers 35 and 37 at its lower and upper ends, travels over the idler or roller 39, which has its bearings in levers 40, pivotally connected with the sides of the main frame. The upwardly-extending arms 41 of the L-shaped castings at the front end of the cutter-frame are pivotally connected with rods 42, that extend rearwardly and have pivotal connections with links 43, pivoted to the sides of the cutter-frame. The upper ends of the links 43 have pivotal connection with the rear ends of the levers 40, as clearly shown in Fig. 2 of the accompanying drawings, which shows the lever arrangement on one side of the machine. It has been already stated that the cutter-frame is pivotally connected with the lower ends of the brackets 29 of the supporting-frame. Now it will be seen that when the front end of said cutter-frame is lowered, which may be accomplished, for instance, by means of a bell-crank lever 44, fulcrumed to the main frame and having a link connection with the cutter-frame, the endless carrier 36 must necessarily be lengthened, which is accomplished by reducing the slack therein which is maintained by the idler 29, connecting the levers 40. Said levers will thus be thrown to the position indicated in dotted lines in Fig. 2, partly by the taking up of slack in the carrier and partly by the action of the links 43, which connect the cutter-frame with the levers 40. The upper ends of said connecting-links 43 being moved slightly in a forward direction will, by means of the intermediate link-bars 42, so adjust the L-shaped castings 31 that the cutting mechanism shall be maintained in a proper position to engage the grain, such adjustment being made according to the distance from the ground at which it is desired to sever the stalks. A reverse movement, of course, will produce an opposite result.

If preferred, the connecting-rod 42 may be disconnected from the link 43 and extended rearwardly to an operating-lever, as 46, which is fulcrumed at a suitable point within convenient reach of the driver's platform upon the push-bar 9. Said operating-lever 46 is provided with an ordinary lock-dog or pawl 47, engaging a rack-segment, whereby the parts may be retained in adjusted position. This modified construction, of course, will in no wise affect the means for taking up and for supporting the slack in the endless carrier.

In the preferred construction of my invention a straw-carrier 49 is suitably disposed in rear of the threshing mechanism to receive the straw and to dump the same in rear of the machine as the latter progresses. Should it be preferred, however, to save the straw, an auxiliary straw-carrier 50 may be disposed in rear of the carrier 49, said auxiliary straw-carrier being extended laterally from the frame of the machine and adapted to deposit the straw in a wagon which may be driven alongside of the machine. The grain-elevator within the casing 28 is likewise disposed to discharge the grain and chaff into a wagon or other receptacle driven alongside the machine.

In certain sections of the country wheat will grow to perfection, while grass, which in other places is depended upon for fodder for domestic animals, will not flourish. In such sections it is customary to depend largely for fodder upon the wheat-straw and upon the second growth of wheat which usually springs up after the first growth, the same sprouting from grains scattered during the harvest of the first crop. An excellent quality of fodder, however, is provided by the chaff, which is usually wasted or intermixed with the straw-stacks in such a manner as to be with difficulty gotten at by the animals. Now by my present invention it will be seen that the grain and the chaff is saved together, the chaff being afterward readily separated from the grain by means of an ordinary fanning-mill, thus enabling it to be saved for fodder purposes. This I consider a feature of my invention of no little importance to the farmers in the so-called "arid" belts where wheat culture predominates, while fodder is scarce. In other sections of the country barley is a crop which is largely raised. Now barley has no chaff; but the barley-straw provides an excellent fodder which it is frequently extremely important to save. When this is the case, it may be desired to chop or cut the straw into suitable lengths, and when this is the case I arrange in rear of the threshing mechanism a couple of feed-rolls 51, by means of which the straw will be carried under a cutting-roller 52, which said rollers have been shown diagrammatically in Fig. 4 and to which motion in the proper direction is to be imparted in any suitable manner from some driven shaft of the machine, such as the cylinder-shaft. These feed and cutting rollers may be of any suitable construction, and inasmuch as such cutting means are well known it is deemed unnecessary to give any further detailed description thereof.

The shaft 22, which carries the cylinder 24, has its bearings in eccentric sleeves 55, journaled in boxings 56 upon the supporting-uprights 23, and said extended sleeves are provided with cranks 57, at the outer ends of which are pivotally-connected rods 58, (see Figs. 8 and 9,) which are to be extended rearwardly within reach of the operator, who thus by manipulating said rods may adjust the eccentric sleeves, and thereby regulate the position of the cylinder with relation to the concave, according to the kind and condition of grain that is acted upon.

It is sometimes found, especially in sections of the country where both summer and winter wheat is grown, that the necessary range of adjustment of the cutting apparatus is so great that the means herein shown for the lengthening and shortening of the endless carrier 36 which conveys the grain from the cutting apparatus to the threshing mechanism are not sufficient. In such case I avail myself of a modified construction. (Illustrated in Fig. 5 of the drawings.) In this case the sides of the cutter-carrying frame (here designated 60) are pivoted at their rear ends to the brackets 61, depending from the main supporting-frame of the machine. The side pieces 60 support upright 62, the upper ends of which have bearings for a shaft 63, supporting the upper end of an endless carrier 64, the lower end of which is supported upon a shaft 65, journaled in suitable bearings directly in rear of the cutting apparatus. The main frame of the machine supports directly in front of the feed-board 38 of the threshing mechanism a shaft 66, and additional shafts 67 68 are provided with bearings upon the main supporting-frame, thus affording supports for an endless carrier 68', the lower lead of which is approximately horizontal, while the front and rear leads of said carrier are disposed, respectively, under the upper end of the carrier 64 approximately parallel to the latter and in a downwardly and rearwardly inclined position leading from the upper end of the carrier 64 to the receiving-opening of the threshing mechanism, being extended, as described, over the feed-board 38. A hood 69 is extended from the threshing-machine casing over the carrier 68' and over the upper end of the carrier 64, as shown. It will be observed that no matter what may be the adjustment of the cutter-carrying frame the carrier 64, which receives the cut grain from the cutting mechanism, will at all times deposit said cut grain upon the carrier 68', which unfailingly conveys it to the threshing mechanism. Both of the carriers 64 and 68' may be constructed in any suitable manner, as may the carrier 36. (Illustrated in Figs. 1 and 2.) Said carriers may, if desired, be provided at their edges with chains engaging sprocket-wheels upon the respective shafts, and motion may be transmitted to said shafts in any desired manner from any driven shaft of the machine. If it is desired to avoid the use of sprocket-wheels and chains in connection with the carriers, such means may be dispensed with and the carriers be mounted directly upon rollers mounted upon the respective shafts. In any case, however, the said carriers, as shown in Fig. 6 of the drawings, comprise flexible aprons, upon which are mounted transverse slats, said apron and slats being designated, respectively, 70 and 71. The slats in this case are composed of sheet metal, bent to form long narrow troughs, in which wooden slats 72 are placed for the purpose of providing the necessary stiffening. The troughs 71 and wooden slats 72 are connected by means of rivets 73 or in any other suitable manner, and one of the edges of the troughs 71 is extended upwardly and provided with a plurality of serrations 74, forming a plurality of sharp-pointed teeth 75, which are integral with what may be denominated the "compound" slats. It is especially when long grain is to be operated upon or when the grain is close to the ground that this form of slats is desirable, inasmuch as the triangular sharp-pointed teeth will engage the blades and joints of the straws and carry the latter unfailingly to the threshing mechanism. I am of course aware that carrier-slats having teeth or fingers are well known in the art; but the triangular teeth of the conformation shown by me will be found to be more certain in the operation thereof and in every respect more dependable.

I desire it to be understood that L-shaped brackets or castings of the exact construction illustrated in Fig. 2 of the drawings are not essential for the purpose of pivotally supporting the cutting apparatus. In the modification illustrated in Fig. 7 the side bars 30 of the cutter-frame are provided at their front ends with castings 78, supporting a shaft 79, upon which cutter-carrying brackets 80 may be mounted, said brackets being provided with upwardly-extending arms 81, which are pivotally connected with the front ends of the adjusting-rods 42. The rear ends of the latter are not necessarily connected with the links 43, as shown in Fig. 1, nor with the operating-lever 46, but may be disposed of or connected with the machine-frame in any suitable and convenient manner.

From the foregoing description, taken in connection with the drawings hereto annexed, the operation and advantages of my invention will be readily understood. By this device the threshing out of the grain and chaff from the straw may be easily and conveniently accomplished, and I thus provide a combined harvesting and threshing machine whereby the cutting and threshing of the grain is accomplished simultaneously and with the expenditure of little more power than would be necessary to simply cut the grain. I would desire it to be particularly observed that by this device the grain is simply removed from the ears by the rubbing action of the cylinder and concave, which may be thoroughly and effectually performed when the cylinder is run at a very much lower rate of speed than ordinary threshing-machines. It will also be seen that the grain which is to be threshed is not concentrated and fed to a narrow cylinder; but that the latter (the cylinder) is of a width practically equal to the entire width of the machine. The consequence is that the grain is spread out and fed to the threshing-machine in a thin layer, so that I am enabled to use a cylinder and concave of extremely light construction compared with the heavy and cumbersome threshing devices which are usually employed when harvesting and threshing machines are incorporated in a single organized machine.

Fanning or separating mechanism has not been included in my improved machine, as herein shown, for the sole reason that it is oftentimes not only desirable but extremely important that the chaff shall be saved along with the grain. This, however, does not preclude me from employing fanning and separating mechanism in connection with my improved machine, and I distinctly reserve the right to do so when desired. I may mention that this may be easily accomplished by disposing separating mechanism below the discharge of the elevator 28$^a$. I likewise reserve to myself the right to any other changes, alterations, and modifications of my invention which may be resorted to within the scope of the same and without departing from the spirit or sacrificing the efficiency of the same.

The general construction of the device is simple and it has an extended range of utility.

Having thus described my invention, I claim—

1. In a machine of the class described, a main frame, a pivotally-mounted cutter-carrying frame, threshing mechanism supported upon the main frame, cutting mechanism at the front end of the cutter-carrying frame, a roller journaled upon said frame directly in rear of the cutting mechanism, a roller journaled upon the main frame directly in front of the threshing mechanism, an endless carrier journaled upon said rollers, an idler engaging said endless carrier, and supporting means for said idler, including levers connected pivotally with the main frame and links connecting said levers with the cutter-carrying frame.

2. In a machine of the class described, a main frame having depending brackets, a cutter-carrying frame connected pivotally with said brackets and extending in front of the main frame, threshing mechanism supported upon the latter, cutting mechanism supported at the front end of the cutter-carrying frame, a roller journaled upon the latter, in rear of the cutting mechanism, a roller journaled permanently upon the main frame in front of the threshing mechanism, an endless carrier mounted upon said rollers, an idler engaging said endless carrier, and supporting means for said idler, including levers connected pivotally with the sides of the main frame, and links connecting said levers with the cutter-carrying frame.

3. In a machine of the class described, a main frame, a cutter-carrying frame mounted pivotally with relation to said main frame, threshing mechanism supported upon the latter, a roller supported permanently upon said main frame in front of the threshing mechanism, a roller journaled at the front end of the cutter-carrying frame, an endless carrier mounted upon said rollers, an idler engaging said carrier, supporting means for said idler including levers connected pivotally with the sides of the main frame and links connecting said levers with the cutter-carrying frame, bell-cranks mounted upon the shaft carrying the roller at the front end of the cutter-carrying frame, cutting means upon the forwardly-extending arms of said bell-cranks, and rods connecting the upwardly-extending arms of said bell-cranks with the links connecting the idler-carrying levers with the cutter-carrying frame.

4. In a machine of the class described, a main frame, a cutter-frame connected adjustably therewith, L-shaped castings at the front end of said cutter-frame, cutting apparatus supported upon said castings, a pivotal rod connecting said castings, a roller mounted upon said pivotal rod, threshing mechanism supported upon the main frame, a roller disposed in front of said threshing mechanism, an endless carrier mounted upon said rollers, an idler engaging said carrier to take up slack, links pivoted to the cutter-frame and having adjustable connection with the rear ends of the idler-carrying levers, and rods pivotally connecting said links with the upwardly-extending arms of the cutter-carrying L-shaped castings.

5. In a machine of the class described, a main frame having depending brackets, a cutter-carrying frame connected pivotally with said brackets, a roller at the front end of said cutter-carrying frame in rear of the cutting apparatus, threshing mechanism upon the main frame, a roller supported permanently in front of said threshing mechanism at a distance from the pivotal point of the cutter-carrying frame, and an endless carrier mounted upon said rollers.

6. In a machine of the class described, a main frame having depending brackets, a cutter-carrying frame connected pivotally with said brackets, threshing mechanism supported upon the main frame, brackets rising from the latter in front of the threshing mechanism, a roller journaled upon said brackets, a roller journaled at the front end of the cutter-carrying frame, and an endless carrier mounted upon said rollers.

7. In a machine of the class described, a main frame having depending brackets, a cutter-carrying frame connected pivotally with said brackets, threshing mechanism supported upon the main frame, brackets rising from the latter in front of the threshing mechanism, a roller supported upon said brackets, a roller at the front end of the cutter-carrying frame, an endless carrier mounted upon said roller, an idler engaging said endless carrier, and means for supporting said idler, including levers connected pivotally with the sides of the main frame, and links connecting said levers with the cutter-carrying frame.

8. In a machine of the class described, the combination with a main frame having depending brackets, of a cutter-carrying frame connected pivotally with said brackets, grain-cutting mechanism connected pivotally with said cutter-carrying frame, means, including a lever and a connecting-link, for effecting the vertical adjustment of the free end of the cutter-carrying frame, and means, including levers fulcrumed upon the main frame, links connecting said levers with the cutter-carrying frame and rods connecting said links with the cutting mechanism, for effecting adjustment of the pitch of the latter.

In testimony that I claim the foregoing as my own I have hereto affixed my signature in the presence of two witnesses.

LEMUEL B. MACK.

Witnesses:
W. A. McCALLEY,
H. A. MITCHELL.